July 16, 1935.  W. A. WALTHERS  2,008,233
POLE HOLDER
Filed Aug. 22, 1934   2 Sheets-Sheet 1
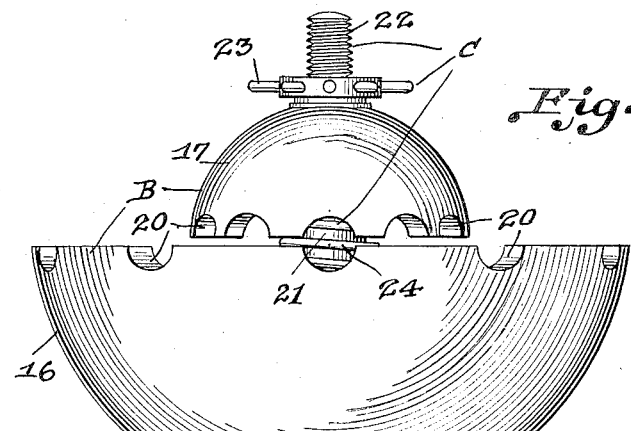
Fig. 1.
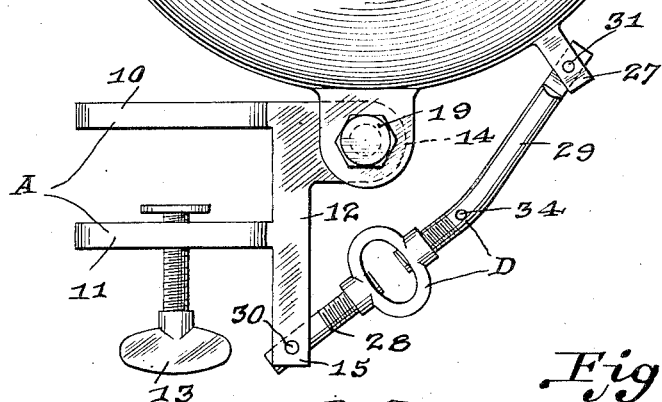
Fig. 2.
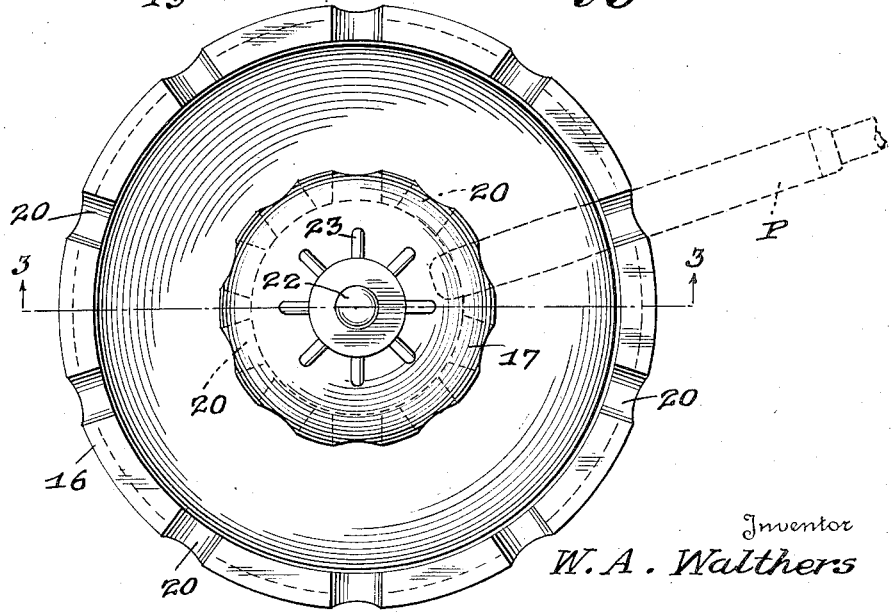
Inventor
W. A. Walthers
By Seymour & Bright
Attorneys July 16, 1935.  W. A. WALTHERS  2,008,233
POLE HOLDER
Filed Aug. 22, 1934  2 Sheets-Sheet 2
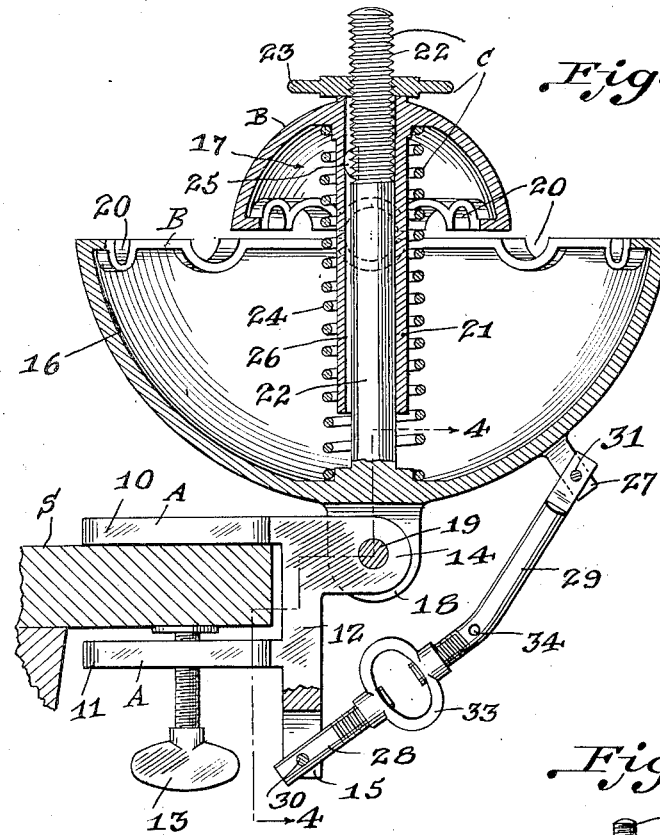
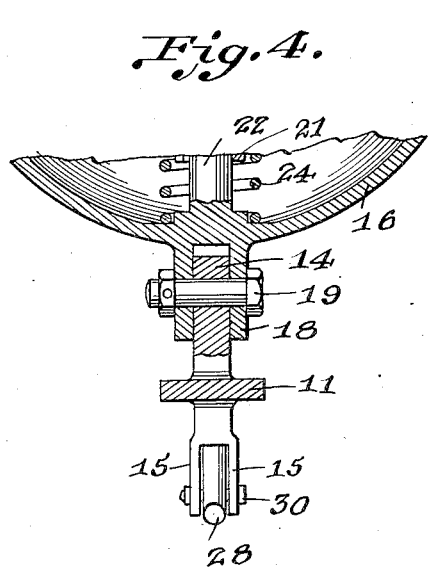
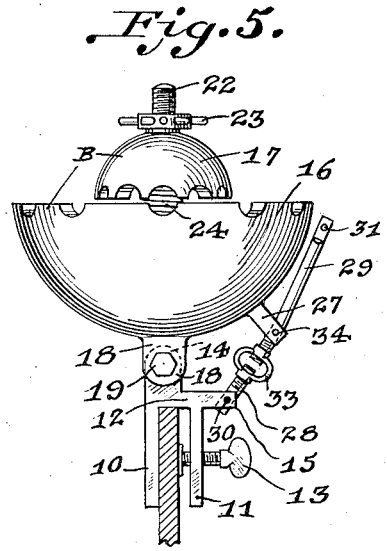
Inventor
W. A. Walthers
Seymour & Bright
By
Attorneys Patented July 16, 1935

2,008,233

UNITED STATES PATENT OFFICE 2,008,233

POLE HOLDER

William A. Walthers, Dalton, Wis.

Application August 22, 1934, Serial No. 740,998

7 Claims. (Cl. 248—39)

The present invention relates to a fishing pole holder adapted to be securely and adjustably mounted on a boat or the like. More specifically, the invention relates to a fishing pole holder adapted to support and retain a plurality of fishing rods or poles in predetermined position, the construction of the holder being such that any rod or rods may be removed from the holder without disturbing the others.

It is well known among fishermen, particularly of the amateur type, that the requisite attention and energy needed to be expended upon the holding of a fishing rod or pole often renders the sport monotonous and tiresome, especially if bites are few and far between.

It is a primary purpose of the present invention to eliminate the above-mentioned defect from the sport of fishing by providing a device adapted to hold and retain the rod (or a plurality of rods) in predetermined position, thus enabling the sportsman to relax and avoid tiresome monotony.

To the foregoing end, the present invention consists, briefly, of a two-part holder proper adapted to engage each rod handle adjacent the end thereof as well as at an intermediate point, whereby the rod is supported somewhat after the manner of a cantilever, of means for adjustably mounting the device onto a boat spar or the like, and means for effecting desired adjustments between the several component parts of the device. The arrangement is such that any rod may be removed from the device, without disturbing the other rods or any of the adjustments, by simply raising the outer part of the rod about its intermediate support as a pivot and then sliding the rod out of the device along such pivot.

With the foregoing objects outlined and with other objects in view which will appear as the description proceeds, the invention consists in the novel features hereinafter described in detail, illustrated in the accompanying drawings, and more particularly pointed out in the appended claims.

Referring to the drawings:

Fig. 1 is a side elevation of a preferred embodiment of the present invention.

Fig. 2 is a top plan view of the construction shown in Fig. 1, the cooperative relationship of a pole end being shown in broken lines.

Fig. 3 is a view partly in elevation and partly in section, the section being taken along the line 3—3 of Fig. 2.

Fig. 4 is a partial sectional view taken along line 4—4 of Fig. 3.

Fig. 5 is a view of the device of the present invention, illustrating the mode of attachment thereof to a boat or the like.

According to the exemplary embodiment illustrated in the above-described figures of the drawings, a preferred construction of my improved fishing pole holder comprises essentially a combined support and clamp member, indicated generally at A, for supporting the pole holder proper and for securely attaching the device as a whole to a boat spar or the like; a two-part pole-holder proper designated generally by reference character B, the several poles being retained in operative position between the parts of the holder; means, indicated generally at C, for adjusting the parts of the holder and for maintaining such parts in adjusted position; and, finally, means D, disposed between the pole-holder proper B and clamp member A for adjusting the relative position between these parts.

The combined support and clamp member A is made up of a pair of spaced clamp plates 10 and 11, joined together at one side thereof by a lateral wall 12; an adjustable clamp screw 13 whereby the device may be mounted on beams, spars or the like of varying thicknesses, as shown for example in Fig. 5 of the drawings; a perforated lug or ear extension 14, projecting laterally from the top of lateral wall 12 and constituting an element of the pivotal connection between parts A and B; and a perforated forked extension 15, projecting downwardly from the bottom of wall 12 and constituting an element of the joint between parts A and D, as hereinafter set forth in greater detail.

The pole-holder proper B consists essentially of substantially semi-spherical pole supporting and retaining discs 16 and 17. These discs 16 and 17 are preferably hollow, as shown, and are disposed in superposed relationship with the open ends thereof opposite each other. Lowermost pole-supporting disc 16, which is of appreciably greater diameter than upper pole-retaining disc 17, is provided at the bottom thereof with spaced, depending, perforated lugs or ears defining fork 18 therebetween. Lug 14 of part A extends into fork 18, and pintle 19, which passes through the alined perforations of members 14 and 18, completes the resultant pivotal connection between parts A and B. The juxtaposed end surfaces of discs 16 and 17 are each provided with a plurality of circumferentially spaced recesses or depressions 20. As is clearly shown in Fig. 2 of the drawings, the depressions of disc 17 are arranged in alinement with the corresponding depressions 20 of disc 16, whereby they are adapted to receive the handle ends of poles P (one of which is shown in broken lines in Fig. 2). Each depression 20 of disc 16 may serve as a support or fulcrum on which an intermediate portion of the handle of pole P may rest, while the corresponding depression 20 of disc 17 bears on the pole adjacent the extreme handle end, preventing rocking movement of the pole about the said fulcrum. Disc 17 is preferably provided with a central, elongated, hollow cylindrical sleeve 21 which extends downwardly therethrough into the interior of disc 16.

Means C for adjusting discs 16 and 17 relative to each other and for retaining the latter and the poles P in desired adjusted position, includes central spindle 22, which may be integral with disc 16, and projects centrally upward from the latter through and beyond sleeve 21 of disc 17. The interior diameter of sleeve 21 is substantially equal to the outer diameter of spindle 22, whereby wobbling or tipping of disc 17 on the latter is prevented. Manually adjustable nut 23 is threadedly mounted on the upper threaded end of spindle 22 directly above disc 17. Spring 24 encompasses bolt 22 and sleeve 21 and tends to urge discs 16 and 17 away from each other, the limit of such movement being determined by the position of nut 23. Adjustment of the latter on spindle 22 effects adjustment of the pitch of poles P. To prevent relative rotary movement between discs 16 and 17, use is made of a gib or key 25 which extends from spindle 22 into a corresponding keyway 26 in sleeve 21.

Means D for adjusting the relative positions of the pole-holder proper and the clamping support A consists essentially of a manually adjustable bolt construction extending between fork 15 of part A and a similar perforated fork 27 suitably projecting from disc 16. The said adjustable bolt construction may comprise bolts 28 and 29, loosely pivoted on pintles 30 and 31, respectively. The adjacent ends of bolts are threaded—one with a right hand thread and the other with a left hand thread,—and are interconnected by manually operable turnbuckle 33, rotation of which in one direction will effect separation of parts 28 and 29, while rotation in the other direction will cause the latter to approach each other. Suitable adjustment of parts 28, 29, 33 thus makes it possible to position holder B substantially horizontally, regardless of the inclination of boat spar S or the like, to which the device may be clamped.

To enable the device to be mounted on a vertically disposed beam or spar, bolt 29 is provided with an additional perforation 34, through which pintle 31 of fork 27 is passed (see Fig. 5).

Having described a preferred embodiment of the invention, details of which may be varied without departing from the spirit thereof, what is claimed is:

1. A device of the character described, comprising a pair of superposed substantially semispherical hollow discs having their open ends opposite each other and adapted to receive a plurality of fishing poles therebetween, means for securely retaining the poles between said discs, means for mounting said discs on a boat or the like, and means for adjusting the relative positions of said last named means and said discs.

2. A device of the character described, comprising a pair of superposed substantially semispherical hollow discs having their open ends opposite each other, the respective end surfaces of said discs having a plurality of spaced alined recesses adapted to receive a corresponding number of poles, and means for securely retaining the poles in said recesses and for varying the pitch of said poles.

3. A device of the character described, comprising a pair of superposed substantially semispherical hollow discs having their open ends opposite each other, the respective end surfaces of said discs having a plurality of spaced alined recesses adapted to receive a corresponding number of poles, means for securely retaining the poles in said recesses and for varying the pitch of said poles, and adjustable means for mounting said discs in a substantially horizontal position on a boat or the like.

4. A device of the character described, comprising a pair of superposed substantially semispherical hollow discs having their open ends opposite each other, the respective end surfaces of said discs having a plurality of alined spaced surfaces adapted to receive a corresponding number of poles, adjustable means on one of said discs for securely retaining the poles in said recesses and for varying the pitch of said poles, adjustable means for mounting said discs in a substantially horizontal position on a boat or the like, and manually operated means for adjusting the relative positions of said last named means and said discs.

5. A device of the character described, comprising a pair of superposed substantially semispherical hollow discs having their open ends opposite each other, the respective end surfaces of said discs having a plurality of alined spaced recesses adapted to receive a corresponding number of poles, adjustable means on one of said discs for securely retaining the poles in said recesses and for varying the pitch of said poles, an adjustable clamp for mounting said discs in a substantially horizontal position on a boat or the like, and manually operated means for adjusting the relative positions of said clamp and said discs.

6. A device of the character described, comprising a pair of superposed substantially semispherical hollow discs having their open ends opposite each other, the respective end surfaces of the said discs having a plurality of alined spaced surfaces adapted to receive a corresponding number of poles, the lower disc being of greater diameter than the upper disc, means including a spindle secured to said lower disc and connected to said upper disc for securely retaining the poles between said discs and for varying the pitch of said poles, an adjustable clamp secured to one of said discs for mounting said disc on a boat or the like, and adjustable means connected to said clamp and one of said discs for adjusting the relative positions of said clamp and said disc.

7. A fishing pole support comprising a pole holder, a clamp for attaching said holder to a boat spar or the like, means pivotally connecting said holder to said clamp, and a turn-buckle having one end connected to said clamp and its other end connected to said holder for adjusting the relative positions of said clamp and said holder, and means for adjusting the connection between said turn-buckle and said holder.

WILLIAM A. WALTHERS.